Figure 1:
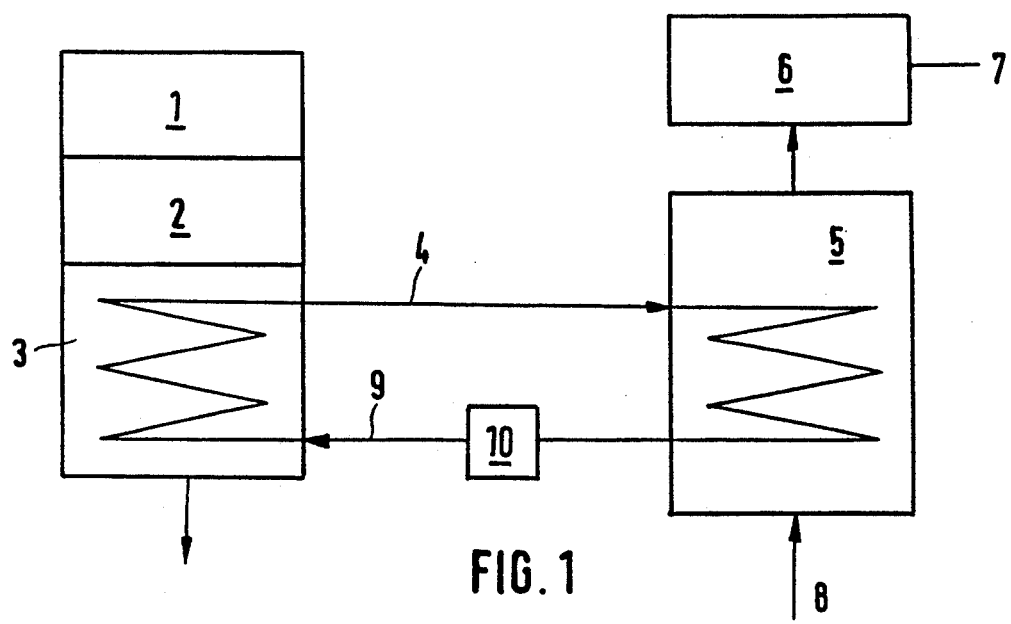

United States Patent [19]
Hauk

[11] Patent Number: 5,327,717
[45] Date of Patent: Jul. 12, 1994

[54] PROCESS FOR DRYING COAL FOR MELT-DOWN OR COAL GASIFIERS

[75] Inventor: Rolf Hauk, Achern, Fed. Rep. of Germany

[73] Assignee: Deutsch-Voest-Alpine Industrieanlagenbau GmbH, Dusseldorf, Fed. Rep. of Germany

[21] Appl. No.: 104,247

[22] Filed: Aug. 9, 1993

Related U.S. Application Data

[63] Continuation of Ser. No. 830,652, Feb. 4, 1992, abandoned.

[30] Foreign Application Priority Data

Feb. 5, 1991 [DE] Fed. Rep. of Germany ....... 4103362

[51] Int. Cl.$^5$ .............................................. F02B 43/00
[52] U.S. Cl. .................................... 60/39.02; 60/39.12
[58] Field of Search .............................. 60/39.02, 39.12

[56] References Cited

U.S. PATENT DOCUMENTS

| | | | |
|---|---|---|---|
| 3,804,606 | 4/1974 | Archer et al. | 60/39.02 |
| 3,990,229 | 11/1976 | Staege | 60/39.12 |
| 4,019,314 | 4/1977 | Springmann | 60/39.12 |
| 4,341,069 | 7/1982 | Bell et al. | 60/39.02 |
| 4,866,928 | 9/1989 | Raiko | 60/39.12 |
| 4,957,049 | 9/1990 | Strohmeyer, Jr. | 60/39.12 |
| 4,976,101 | 12/1990 | Schiffers | 60/39.12 |
| 5,175,993 | 1/1993 | Raiko et al. | 60/39.02 |

OTHER PUBLICATIONS

"Marks' Standard Handbook for Mechanical Engineers" Eighth Edition, McGraw-Hill, 1978 pp. (9-21,23).

Primary Examiner—Richard A. Bertsch
Assistant Examiner—Michael I. Kocharov

[57] ABSTRACT

The invention relates to a process for drying coal with a natural moisture content, which is supplied to melt-down or coal gasifiers, in which drying takes place by means of the excess energy obtained on coupling to a gas turbine power station. The excess energy is supplied by means of a fluid to at least one drier by heat release from at least one auxiliary unit ensuring or improving energy generation.

1 Claim, 3 Drawing Sheets

PROCESS FOR DRYING COAL FOR MELT-DOWN OR COAL GASIFIERS

This application is a continuation of application Ser. No. 07/830,652, filed Feb. 4, 1992 now abandoned.

The invention relates to a process for drying coal with a natural moisture content, which is supplied to the melt-down or coal gasifiers, in which drying takes place by means of the excess energy obtained on coupling to a gas turbine power station.

For efficiency improvement reasons, the coal used for gasification in melt-down or coal gasifiers must be dried from an average moisture content (approximately 15%). Without drying coal transportation is impeded and as a result of the endothermic action of the moisture content there is a deterioration in the composition of the gas produced (DE 1 017 314, DE 3 537 758). The proportion of combustible constituents in the gas produced can, without drying the coal to be gasified, only be increased by raising the oxygen quantity to be blown into the gasifier.

Austrian patent 380 697 proposes preheating the coal with drawn off top gas. This leads to increased expenditure for the construction of such a plant, because additional influences must be taken into account when operating the melt-down gasifier. In addition, part of the energy of the top gas is used for drying the coal, so that the plant efficiency is reduced.

DE 2 920 922 proposes a process and an apparatus for the gasification of coal, whose set problem is to gasify the coal reliably and with an increased efficiency with in particular a better thermal efficiency of the molten slag and whilst causing little harm to the environment. Use is made of the sensible heat of the molten slag and steam is produced. The steam is in part supplied as a gasifying medium and in each case a partial flow is used for drying the coal and for producing mechanical energy. However, to ensure that no environmentally prejudicial waste waters are produced, increased expenditure is required for cleaning the water to be used and additional water must be added.

A process for producing combustible gases in a melt-down gasifier is also known from DE 4 004 938. The combustible gas is used in a gas turbine steam power station for generating electrical energy and heat in the form of steam. For the economic, environmentally friendly and reliable operation of the overall plant, there is an additional air separator for producing oxygen, pure nitrogen and part of the gas with a high nitrogen content, a desulphurization reactor and various heat exchangers, compressors and additional control and regulating units. Here again the coal can only be dried either by burning the gas produced or by burning other fuels, which is prejudicial to the efficiency.

Therefore the problem of the invention is to dry coal, which is gasified in a melt-down or coal gasifier, in order to inter alia obtain combustible gas for the production of electrical and thermal energy in a gas and steam turbine power station, in that hitherto unused energy is more effectively employed in the process and there is no additional harm to the environment.

According to the invention this problem is solved by the characterizing features of claim 1. The coal to be gasified is dried in a drier by means of nitrogen-containing gases, whilst utilizing the excess energy. The excess energy obtained by heat exchange with a fluid from an auxiliary unit ensures the electrical and thermal energy production and improves the energy balance.

The excess energy for heating the fluid can be obtained from the air of an air separation plant heated by compression and which provides the oxygen and nitrogen necessary for operating the gasifier. Another possibility is the utilization of the heat of the hot gases drawn off in heat exchange with the fluid from a desulphurization reactor, the drawn off hot gas of the gasifier or melt-down gasifier or the top gas of a reduction shaft furnace. The heat of the flue gases passing out of the gas turbine and the heat of the water in the power station cooling circuit are also available.

Besides hot water and steam, air can also be used as the fluid for conveying the thermal energy to the drier.

When using hot water it should preferably be compressed to such an extent that its evaporation temperature is not reached and is available in the liquid phase. This ensures a higher energy density, lower wear and pressure losses in the line or pipe system.

Advantageously the coal is dried with nitrogen. Therefore higher drying temperatures can be obtained and the drying process is shortened. In the case of nitrogen with a low residual oxygen content, a reaction of the coal is almost completely excluded. As a result of the air separation plant necessary for operating the gasifier, the nitrogen is available in an adequate quality and quantity. The nitrogen quantity is so large, that a further energy generation possibility is provided. After heating a partial flow can be branched off, which is not used for coal drying and is instead expanded to atmospheric pressure in an expansion turbine.

The invention is described in greater detail hereinafter relative to embodiments and the attached drawings, wherein show:

FIG. 1 The utilization of the excess energy of the waste heat system of a gas and steam turbine power station for drying coal to be gasified.

Figure 2:
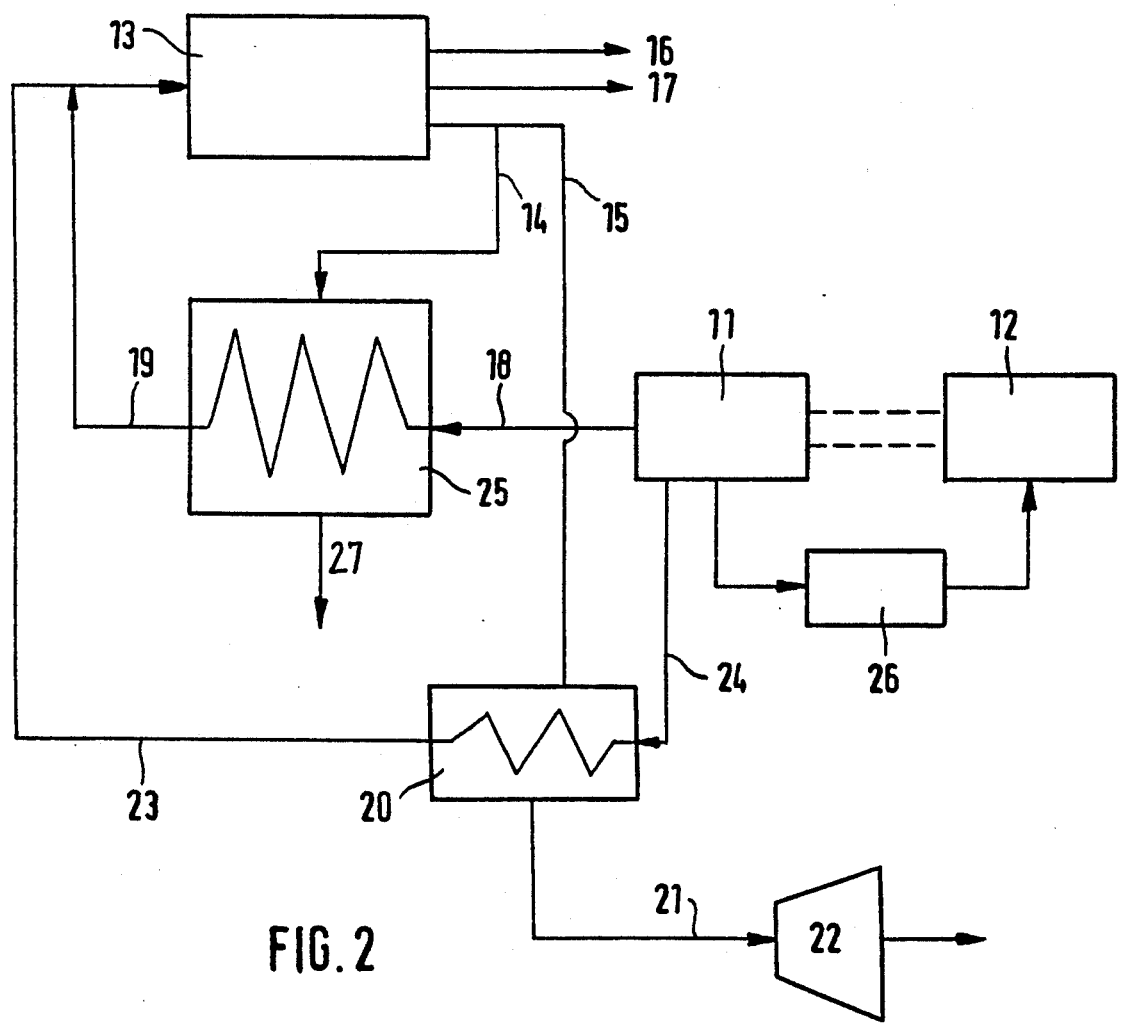

FIG. 2 The use of the excess energy of several auxiliary units, in which nitrogen is used as the fluid.

Figure 3:
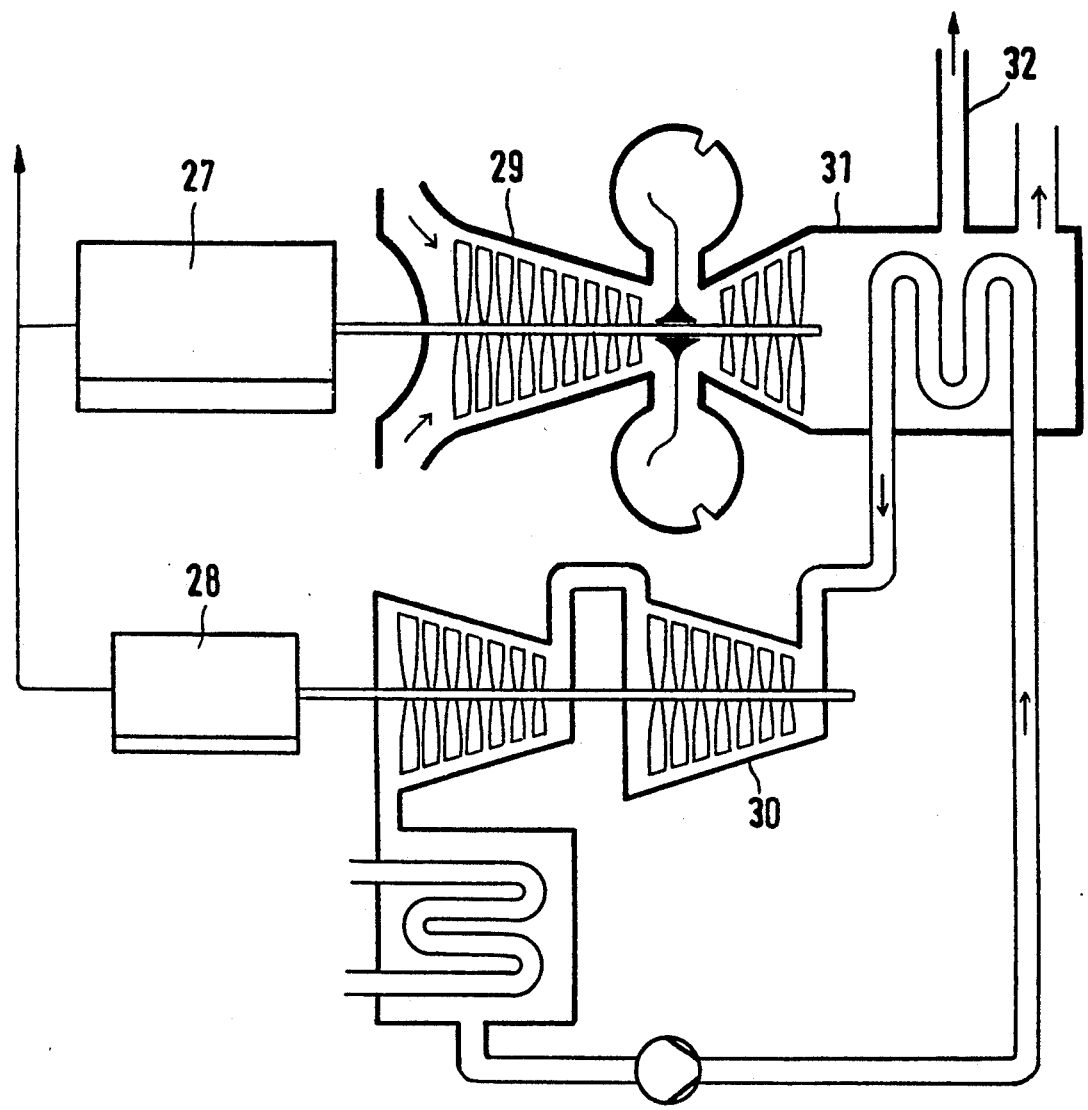

FIG. 3 A flue gas release from a gas and steam turbine power station.

Figure 4:
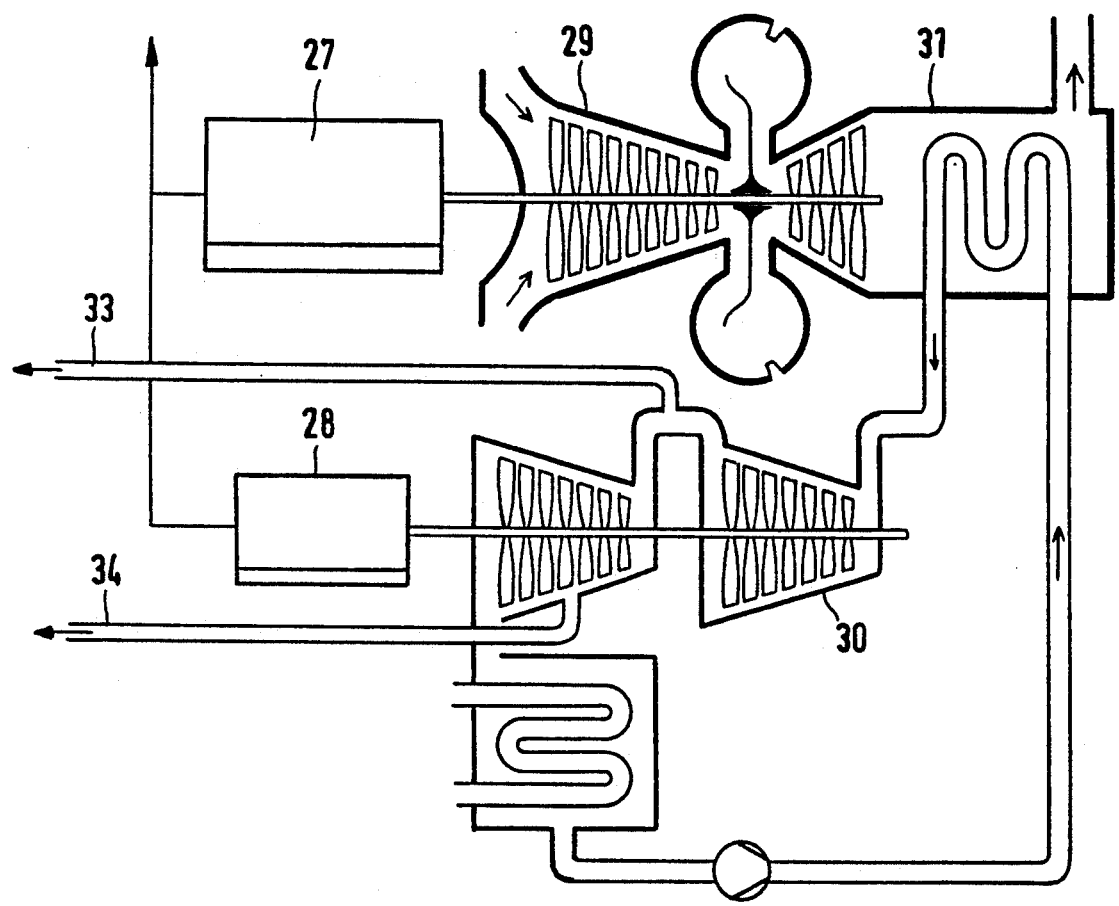

FIG. 4 A two-stage steam release from a gas and steam turbine power station.

The diagrammatic representation of FIG. 1 makes it clear how the excess energy of a gas and steam turbine power station made available by steam production and the hot flue gases can be used for drying coal.

The hot flue gases leaving the gas turbine 1 at a temperature of approximately 520° C. firstly flow through a heat exchanger 2, where steam for the gas turbine is produced. The flue gases then flow through the heat exchanger 3, where heat is given off to the fluid, in this case hot water and heats it to approximately 250° C. The hot water passes through the line 4 to the heat exchanger 5 and gives off its heat to the air flowing through the heat exchanger 5.

For drying 80 t/h off coal with a 10% moisture content and which is to be reduced to 5%, 90,000 m³/h of air are required at a starting temperature of approximately 20° C. The hot water enters the heat exchanger at its inlet 8 at approximately 220° C., in order to ensure a drying air temperature of 200° C. in the drier 6. The air temperature drops to approximately 70° C. during drying and the air leaves the drier through the flue 7.

The hot water flows out of the heat exchanger 5 through line 9 back into the heat exchanger 3. The pump 10 raises the pressure of the hot water to above 40 bar in order to prevent evaporation. This high pressure ensures that the hot water does not evaporate so that, as a result of the higher energy density, smaller line or pipe cross-sections are possible and wear in the latter and in the heat exchanger is limited.

Alternative embodiments utilize the heat of the hot gases drawn off in heat exchange with the fluid from a desulphurization reactor, the drawn off hot gas of the gasifier or melt-down gasifier, or the top gas of a reduction shaft furnace. These embodiments are illustrated schematically in FIG. 1, where the reference numeral "1" represents any of these described auxiliary units. The hot gas from any one of the auxiliary units 1 then flows to heat exchanger 2 as described above.

FIG. 2 diagrammatically shows how excess energy of a combined compressor 11, which supplies both a gas turbine 12 and an air separation plant 13 with compressed air, is used for drying purposes. The drying medium is here constituted by nitrogen with an oxygen proportion of approximately 1%, the nitrogen being taken from the air separation plant 13 through the lines 14 and 15.

With a drying capacity of 80 t/h of coal with a moisture content of 10%, which is to be reduced to 5%, and a pig iron production of 80 t/h in a not shown melt-down gasifier, 220,000 m³/h of air must be separated in the air separation plant 13 into 46,000 m³/h of oxygen (21%), 7,000 m³/h of high purity nitrogen (3%) and 167,000 m³/h (76%) nitrogen with a residual oxygen content of 1% and other impurities.

The oxygen and high purity nitrogen are supplied to the process via lines 16 and 17. The residual nitrogen is split into partial flows. Through the line 14 80,000 m³/h pass into a heat exchanger 25 with a starting temperature of approximately 15° C. and leave it through the line 27 for a not shown drier with a temperature of approximately 250° C. The drier is preferably a vibrating or drum drier.

The air heated by the excess energy of a compressor 11 passes at a temperature of 400° C. through the line 18 into the heat exchanger 25 and heats the nitrogen for drying the coal. Approximately 54,000 m³/h of hot air are required for heating in the heat exchanger 25, leaving the latter through the line 19 at a temperature of approximately 50° C. and being led into the air separation plant 13 after further cooling. With the low oxygen content of the nitrogen and the correspondingly high inert action, it is obviously also possible to use higher temperatures for drying the coal, which increases the drier capacity or the drier can be made smaller for the same capacity.

The second partial flow of approximately 87,000 m³/h (52% nitrogen) passes through the line 15 into the heat exchanger 20 and from its starting temperature of 15° C. reaches a temperature of approximately 380° C. and is supplied through the line 21 at a pressure of approximately 3 bar to an expansion turbine 22, which releases mechanical energy for further energy conversion. The heat exchanger 20 is also heated by air heated by excess energy of the compressor 11 and having a temperature of approximately 400° C. and which is led to it through the line 24. This air leaves the heat exchanger 20 through the line 23 with a temperature of approximately 210° C. and, after further cooling, is passed into the air separation plant 13.

FIG. 2 also shows a combustion chamber 26, which is connected upstream of the gas turbine 12 and which is supplied with air from the compressor 11.

FIG. 3 shows a possibility of flue gas release from a gas and steam turbine power station enabling excess energy to be used for coal drying. A conventional gas and steam turbine power station supplying electrical energy by means of two generators 27, 28 and which are driven by a gas turbine 29 and a steam turbine 30, makes it possible to release flue gas from the waste heat steam generator 31, the flue gas energy of the gas turbine 29 being used for generating steam for the production of the steam turbine 30. The flue gas at approximately 230° C. leaves the waste heat steam generator 31 through the line 32 and can then be used for drying coal either directly or by heat exchange on another fluid in a not shown heat exchanger.

Another variant for releasing excess energy is illustrated for the same power station in FIG. 4. In this case line 33 supplies steam at a temperature of approximately 235° C. and a pressure of 30 bar and/or through the line 34 at a temperature of approximately 160° C. and a pressure of 6 bar in each case to a not shown heat exchanger, in which is heated a fluid (e.g. air, nitrogen) suitable for drying the coal.

I claim:

1. In connection with a gas turbine power plant coupled to an air separation plant by way of a compressor unit, a process for drying coal having a natural moisture content for supply to a melt-down gasifier or coal gasifier, comprising the steps of:
   (a) operating a compressor unit to supply compressed air to a combustion unit of a gas turbine power plant and to an air separation plant;
   (b) operating said combustion unit to supply energy for operation of a gas turbine;
   (c) operating said gas turbine to produce energy via flue gases exiting therefrom;
   (d) operating a first heat exchanger with the energy from the flue gases;
   (e) operating a steam generation unit in connection with said first heat exchanger to produce steam to be used to generate electricity;
   (f) operating a second heat exchanger using solely the excess energy generated by the compressor unit;
   (g) operating a coal drying unit in connection with said second heat exchanger;
   (h) operating said air separation plant to produce a first gas stream of essentially pure nitrogen and a second gas stream;
   (i) supplying said essentially pure nitrogen to said coal drying unit as a drying medium, the nitrogen being heated in said second heat exchanger;
   (j) operating a third heat exchanger using solely the excess energy generated by the compressor unit;
   (k) heating said second gas stream in said third heat exchanger;
   (l) passing said heated second gas stream into an expansion turbine to create further excess energy.

* * * * *